United States Patent [19]
Leu

[11] Patent Number: 5,299,819
[45] Date of Patent: Apr. 5, 1994

[54] COMBINATION CHAINLESS DRIVING DEVICE OF BICYCLE

[76] Inventor: Jiunn-Horng Leu, 208 guang-tsae lane, Jiayi city, Taiwan

[21] Appl. No.: 984,365

[22] Filed: Dec. 2, 1992

[51] Int. Cl.$^5$ .............................................. B62M 1/06
[52] U.S. Cl. .................................................. 280/260
[58] Field of Search ................. 280/260, 259; 180/226

[56] References Cited

U.S. PATENT DOCUMENTS

| | | | |
|---|---|---|---|
| 2,378,634 | 6/1945 | Hussey | 280/260 |
| 3,861,715 | 1/1975 | Mendoza | 280/260 |
| 4,436,173 | 3/1984 | Takahashi | 180/226 |
| 4,613,010 | 9/1986 | Enocson | 280/260 |
| 4,943,077 | 7/1990 | Lin et al. | 280/260 |

FOREIGN PATENT DOCUMENTS 44385  2/1989  Japan .................................. 280/260

*Primary Examiner*—Margaret A. Focarino
*Assistant Examiner*—Kevin Hurley

[57] ABSTRACT

A combination chainless driving device of a bicycle comprises a five-way seat housing a crank axle and having a connecting portion and a front connecting mount fastened to an end of a fork connecting mount fastened to an end of a fork tube and provided with a front auxiliary gear mounted thereinto. The front auxiliary gear meshes with a main gear fastened to the crank axle. Fastened to another end of the fork tube is a rear connecting mount provided with a rear main gear mount thereinto. The rear connecting mount is fastened to a gear box in a manner that the rear main gear engages a rear auxiliary gear inside the gear box. The rear auxiliary gear has a shaft portion provided with an axial hole to receive therein a rear wheel axle. The gear box has an axle locking mount provided with an axle receiving slot for locking the rear wheel axle of a nave which is provided with a drive frame covered by a semicircular frame of the gear box and fastened to the axle locking mount by means of a rear cover.

7 Claims, 10 Drawing Sheets

COMBINATION CHAINLESS DRIVING DEVICE OF BICYCLE

BACKGROUND OF THE INVENTION

The present invention relates to a chainless driving device of a bicycle, which can be assembled easily and operated with a transmission stability.

As shown in FIGS. 1 and 2, front portion of a prior art combination chainless driving device of a bicycle, as disclosed in the Taiwanese Patent 163732, comprises a crank shaft 5A which is driven by a pedal and is housed securely in a crank hanger 62A with a shaft tube 6A fastened thereto. The shaft tube 6A receives therein an inner lining shaft 61A. A sector wheel 3A is fastened securely to an end of the inner lining shaft 61A, which is adjacent to the crank shaft 5A. The sector wheel 3A is provided with a coupling edge 31A engageable with a sector wheel 4A of the crank shaft 5A. A locating mount 1A is provided with a ball slot 11A opposite in location to the coupling edge 31A and with a ball ring surface 12A. A ball supporting plug 2A is disposed in a location corresponding to the ball ring surface 12A and is provided with a supporting edge 21A. The sector wheel 3A, the locating mount 1A and the ball supporting plug 2A are fastened to the inner lining shaft 61A. The ball 14A is arranged between the sector wheel 3A and the ball slot 11A. Another ball 14A is arranged between the ball ring surface 12A of the locating mount 1A and the supporting edge 21A of the ball supporting plug 2A. The rear wheel of the bicycle is driven by a rear gear set, which is in turn driven by the inner lining shaft 61A, which is in turn driven by the crank axle 5A.

The rear wheel of the bicycle is driven by the inner lining shaft 61A which in turn is driven by the sector wheel 3A engaging with the sector wheel 4A of the crank axle 5A. The process of locating the sector wheel 3A on the inner lining shaft 6A is complicated and can not be done easily, unless the component parts used in locating the sector wheel 3A are made in accordance with certain specifications. In addition, the crank hanger 62A must be welded to the bicycle frame with precision, thereby undermining the work efficiency of assembling the driving device of the bicycle.

The rear section of a prior art chainless driving device of bicycle is disclosed in the Taiwanese Patent 154043. The prior art driving device comprises a sector helical gear 9, which is mounted in a gear box 7A in a manner that it engages a sector helical auxiliary gear 100A having a restraining flange 101A. Located in the tubular body of a one-way ratchet sleeve 82A are a steel ball slot 102A, a one-way ratchet 103A, and a double-stepped steel ball slot 104A. A locking plug ring 108A is fastened to a threaded portion 109A. The one-way ratchet 103A meshes with the one-way ratchet sleeve 82A. All components of the driving device are fastened to a middle axle 8C by means of a supporting plug ring 110A and a fastening nut 111A. The gear box 7A is provided with a sleeve 72 located at one end thereof and with a side cover 73A located at another end thereof. In addition, the gear box 7A is further provided with a bearing slot 74A, an axial hole 75A, and an axial hole 76A located oppositely to the axial hole 75A and dimensioned to permit the middle axle 8C to pass through. A locating frame 270A is provided with a through hole 271A and is fastened by means of an upper bearing 112A which is mounted in the bearing receiving slot 74A of the gear box 7A, so that the driven sector helical gear 100A engages a driven sector helical gear 9. The middle axle 8C is put through the axial hole 76A and the through hole 271A of the locating frame 270A and is then fastened securely by means of a nut 113A. The rear section of the driving device is driven by the front section of the driving device. In other words, the one-way ratchet sleeve 82A and a wheel drum 85A are driven by the front section of the driving device to drive the rear wheel of the bicycle. Such design of the driving mechanism as described above is costly and time-consuming. In addition, the middle axle 8C is exerted on by the weight of a bicyclist. Located between the driven end of the wheel drum 85A and the stationary middle axle 8C are large steel balls 106A arranged in an annular manner. These large steel balls 106A are supported by the supporting plug ring 110A and are also responsible for stabilizing the transmission of the driven sector auxiliary gear 110A and the driven sector helical gear 9. The moment of force at the supporting plug ring 110A, which supports the large steel balls 106A, is excessive, thereby making the supporting plug ring 110A vulnerable to a shock caused by a force of reverse action of the rear wheel which happens to hit a hole or a pit in the road. Such incident can bring about an irregular transmission or a structural damage to the middle axle 8c.

SUMMARY OF THE INVENTION

It is, therefore, the primary objective of the present invention to provide a chainless driving device of a bicycle with a crank axle which is mounted securely in a crank hanger provided with a drive shaft having a connecting portion provided with a gear cell in communication with the crank hanger. The connecting portion has an end that is fastened to a front connecting mount having an end fitting over a right lower fork tube. As a result, a front auxiliary gear fastened to the drive shaft is mounted in the front connecting mount in a manner that the front auxiliary gear meshes with a front main gear of the crank axle. Another end of the right lower fork tube is fitted into a rear connecting mount. The rear main gear set is mounted in the rear main gear engages a rear auxiliary gear having a shaft portion with an outer edge provided with a one-way ratchet sleeve. The shaft portion of the rear auxiliary gear is provided therein with an axial hole to receive therein a checker plate of the rear wheel axle. The checker plate is provided with a drive frame having therein a one-way ratchet engaging with the one-way ratchet sleeve for making a unidirectional driving motion. The gear box has an axle locking mount perpendicular to the rear wheel axle. The axle locking mount has an axle receiving slot for receiving the end portion of the rear wheel axle which is fastened by a nut. The half of the drive frame of the checker casing is surrounded by a semicircular frame, with another half of the drive frame being fastened to the axle locking mount by means of a rear cover.

It is another objective of the present invention to provide a chainless driving device of a bicycle with a crank hanger provided with a tube locking mount having a plurality of through holes corresponding in location and number to the round holes of the connecting frame located at the intersection of seat tube and the down tube. As a result, the connecting frame can be fastened to the tube locking mount by means of bolts. In other words, the seat tube and the down tube are also fastened to the crank hanger.

It is still another objective of the present invention to provide a chainless driving device of a bicycle with means facilitating the front connecting mount and the rear connecting mount to be fastened to the connecting portion of the crank hanger and to the gear box. The shaft portions of the front auxiliary gear and the rear main gear are fitted over with the bearing which is further retained securely by a C-shaped rataining ring. As a result, an excellent arrangement of the driving device is attained by mounting the bearing in the bearing receiving slot. Therefore, the assembly and the maintenance of the driving device are made easy and simple.

It is still another objective of the present invention to provide a chainless driving device of a bicycle with a rear auxiliary gear which is driven by a one-way ratchet sleeve and is provided with an axial hole for receiving therein the rear wheel axle. The axial hole is provided with an inner ball slot and an outer ball slot. The rear wheel axle is provided with a double-faced ball receiving portion opposite in location to the inner ball slot and is further provided with a ball plug opposite to the outer ball slot. The checker casing is provided with a plurality of ball slots for receiving therein a plurality of balls. The balls are also received respectively in the inner ball slot and the outer ball slot of the rear auxiliary gear. The balls are locked securely by the ball plug, which is fastened in a direction toward the inside of the outer ball slot. As a result, the rear auxiliary gear is located rapidly, and the one-way ratchet sleeve meshes with the one-way ratchet of the drive frame of of the checker casing.

It is still another objective of the present invention to provide a chainless driving device of a bicycle with a gear box having an axle locking mount perpendicular to the rear wheel axle and corresponding in location to the center of the rear main gear. The gear box is further provided with an axle receiving slot for the rear wheel axle to be fastened to the axle locking mount. The distance between the rear auxiliary gear and the rear wheel axle is about corresponding to the radius of the rear main gear. In addition, the rear auxiliary gear is driven by the rear main gear and is supported on the rear main gear by a ball. In the meantime the checker casing is supported on the wheel axle by a ball which is not the same as the one that supports the rear auxiliary gear. As a result, a reactional external force coming from the rear wheel has no impact on the engagement of the rear main gear and the rear auxiliary gear, thereby ensuring that the transmission stability is attained.

It is still another objective of the present invention to provide a chainless driving device of a bicycle with a gear box which has a semicircular frame corresponding in location to the drive frame of the checker casing and has an insertion slot opposite in location to the frame body of the rear cover. Therefore, the rear cover can be easily fastened to the axle locking mount of the gear box by inserting the frame body of the rear cover into the insertion slot of the gear box.

It is still another objective of the present invention to provide a chainless driving device of a bicycle with a gear box which is fastened to the rear wheel axle and is provided with two lugs, each of which has a locking hole for use in fastening the seat stay to the gear box.

DETAILED DESCRIPTION OF THE PREFERRED EMBODIMENT

Figure 1:
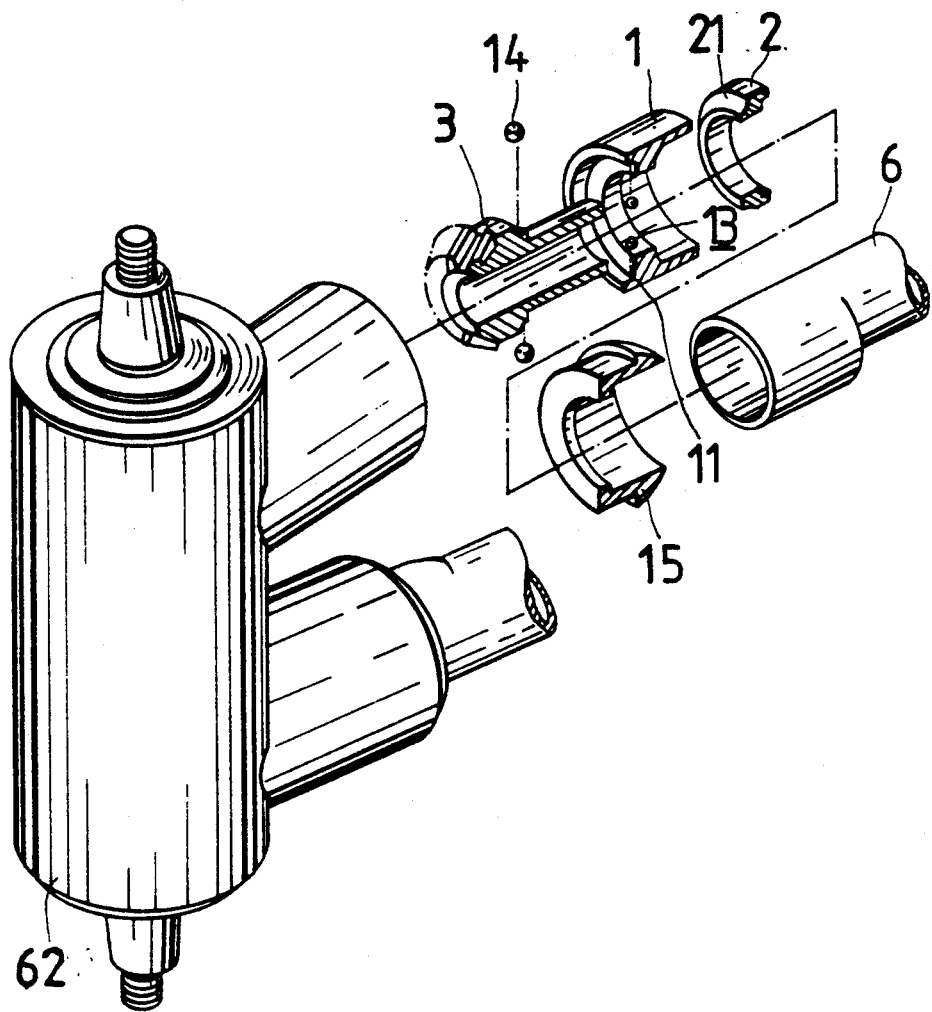
FIG. 1 shows an exploded view of a chainless driving device of the prior art.
Figure 2:
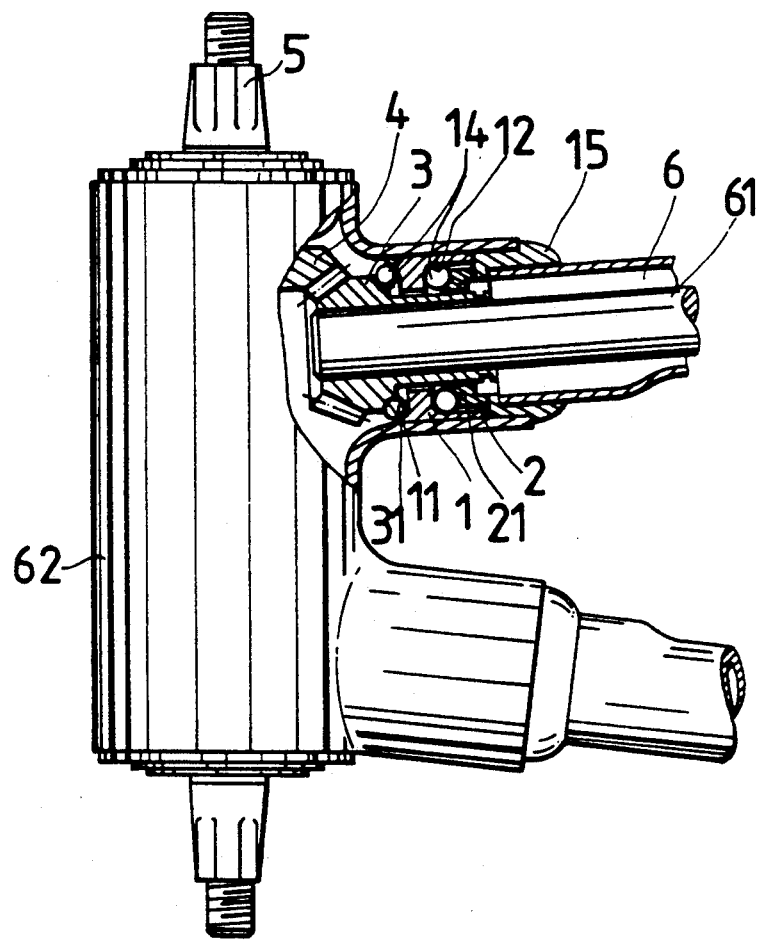
FIG. 2 shows a sectional view of the chainless driving device in combination as shown in FIG. 1.
Figure 3:
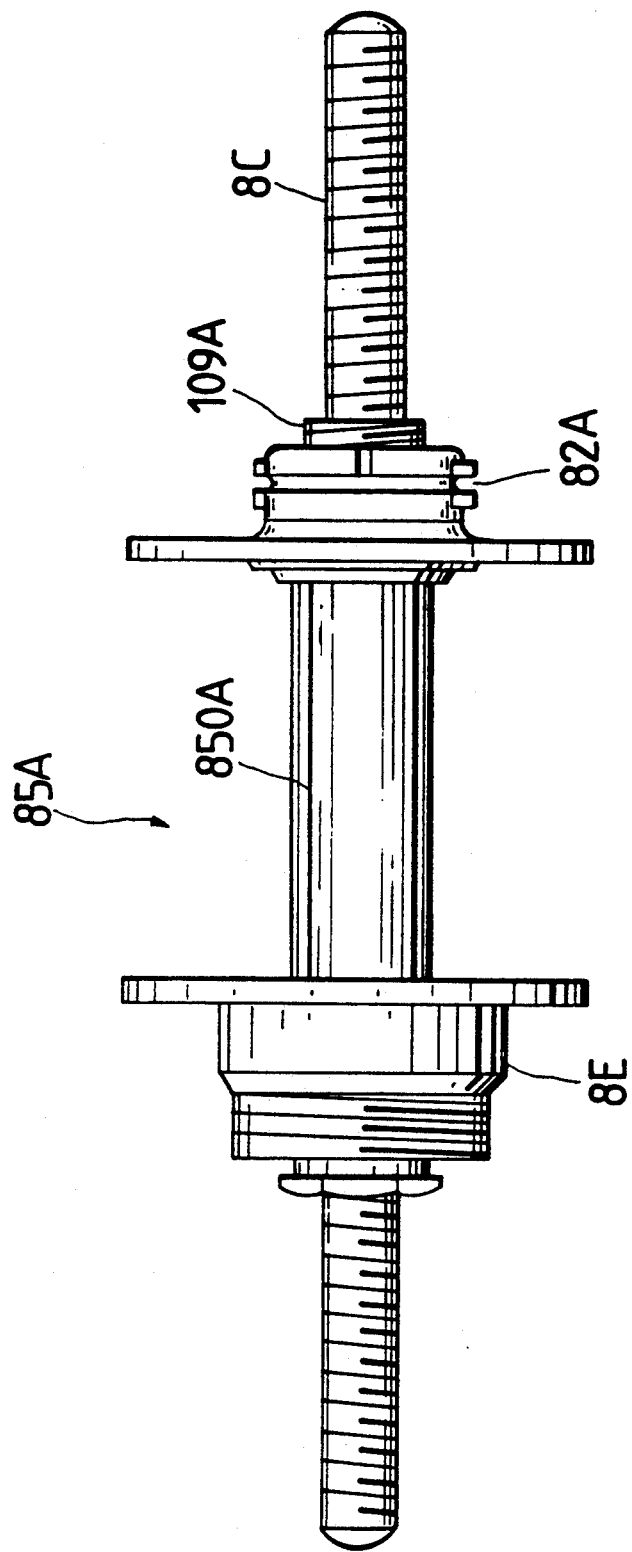
FIG. 3 shows a schematic view of a bicycle driving device provided with the wheel drum and the one-way ratchet sleeve, according to another prior art.
Figure 4:
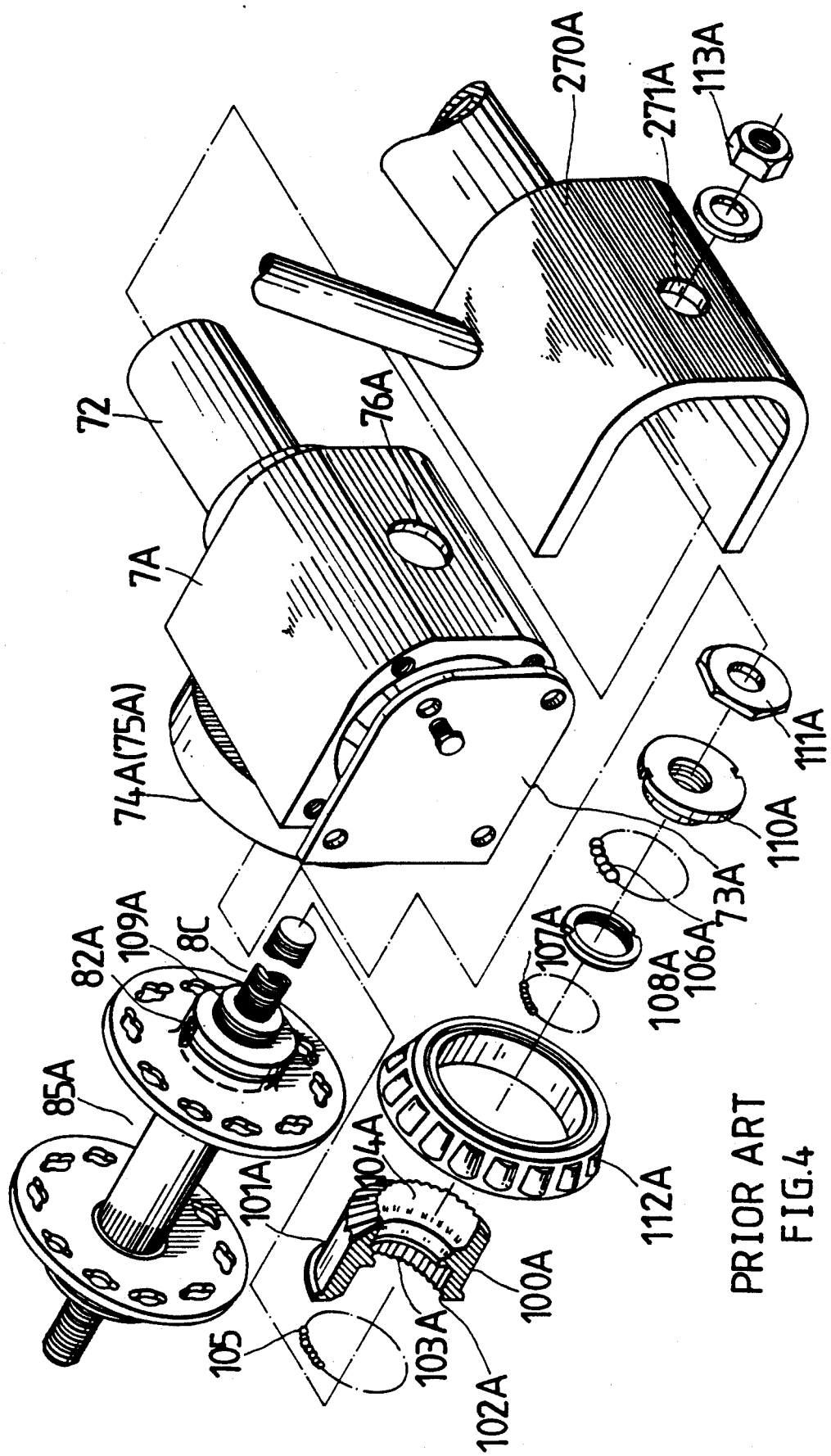
FIG. 4 shows an exploded view of the bicycle driving device as shown in FIG. 3.
Figure 5:
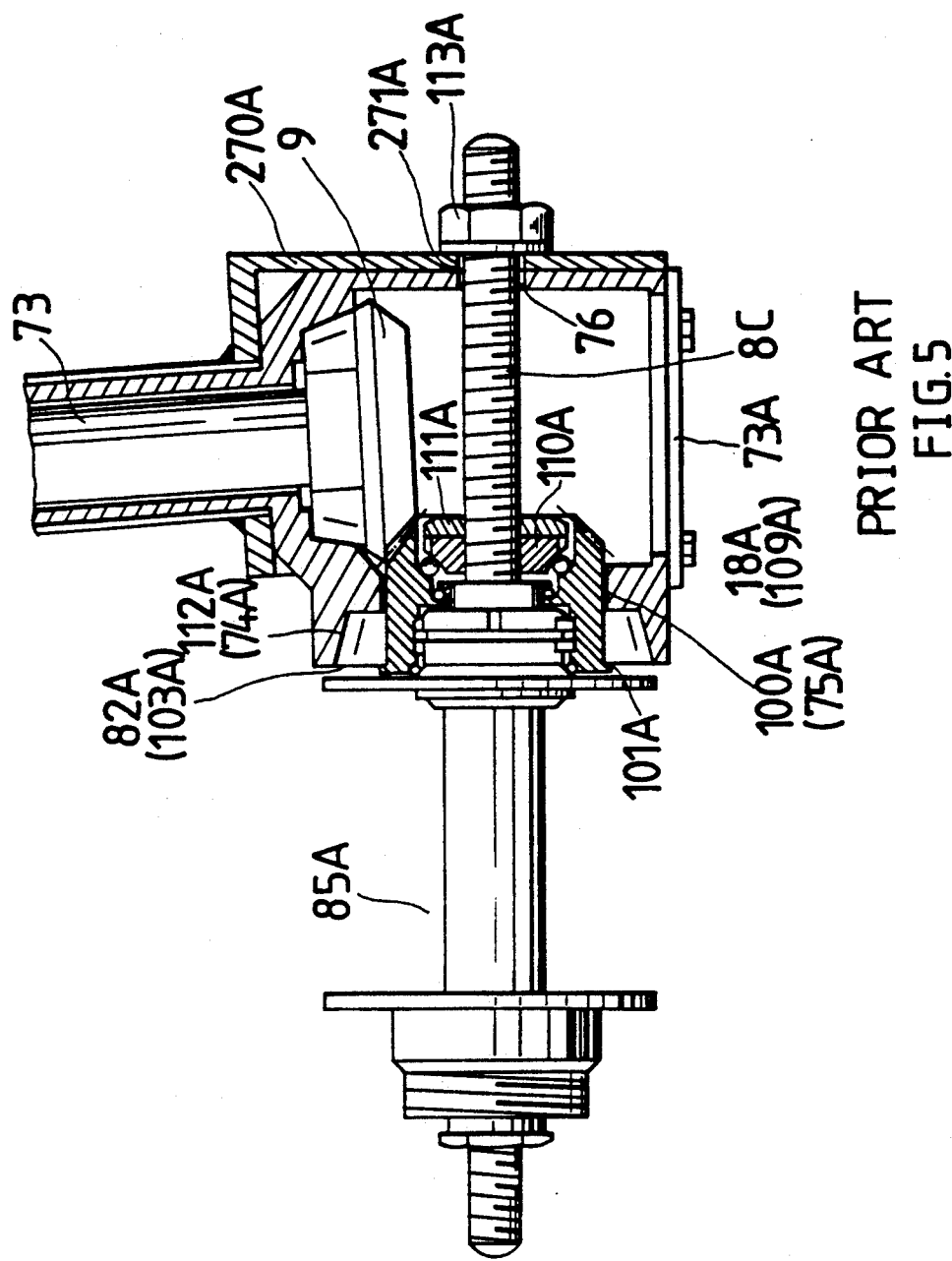
FIG. 5 shows a plan view of the bicycle driving device in combination as shown in FIG. 4.
Figure 6:
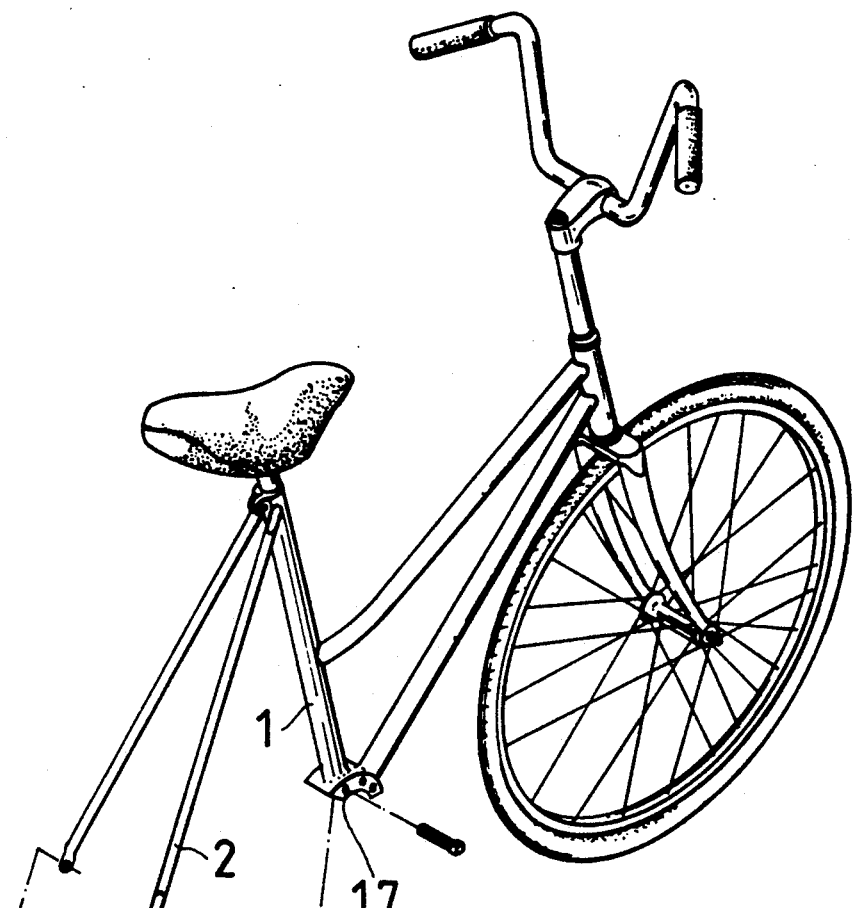
FIG. 6 shows a perspective of a bicycle provided with a chainless driving device of the present invention.
Figure 7:
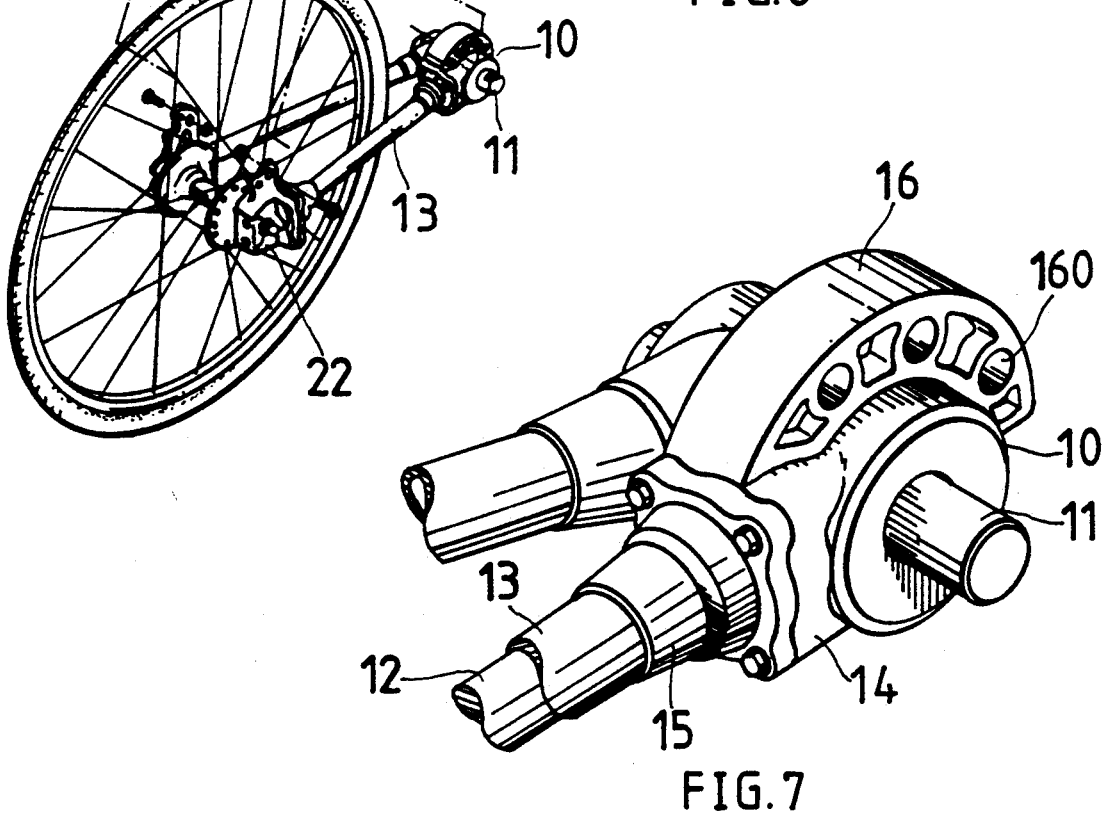
FIG. 7 shows a perspective view of a crank hanger of the chainless driving device of the present invention.
Figure 8:
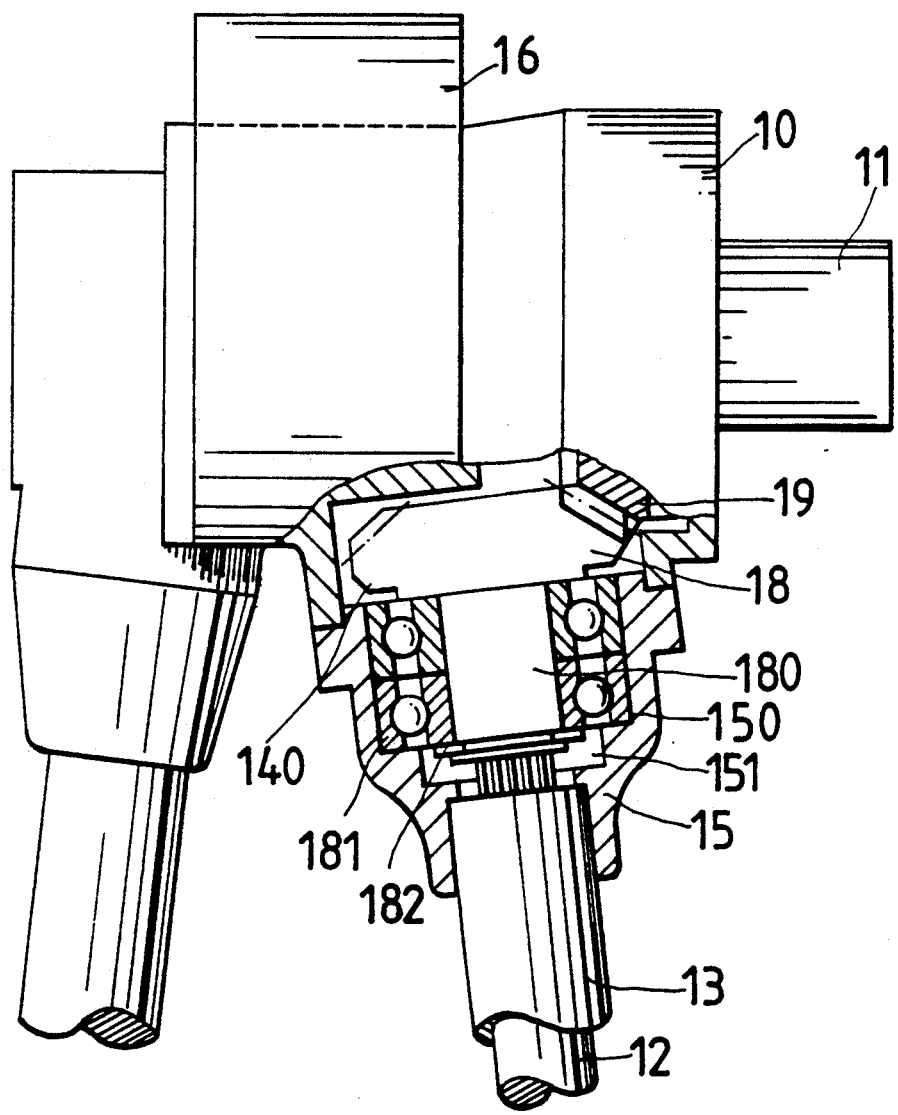
FIG. 8 shows a sectional view of a front connecting mount of the chainless driving device of the present invention.

Referring to FIGS. 6, 7 and 8, a chainless driving device of the present invention is shown to comprise the component parts, which are described explicitly hereinafter.

A crank hanger 10 is used to house a crank axle 11 and is provided with a connecting portion 14 provided therein with a gear cell 140 in communication with the crank hanger 10. The connection portion 14 is fastened at one end thereof with a front connecting mount 15 by a right lower fork tube 13. A drive shaft 12 is fastened to the crank hanger 10, which is further provided with a tube locking mount 16 opposite in location to seat tube 1. The tube locking mount 16 has three through holes 160. Located under the seat tube 1 is a connecting frame 17 having three round holes 17 corresponding in location to the three through holes 160 of the tube locking mount 16. As a result, the seat tube 1 can be fastened to the crank hanger 10.

The front connecting mount 15 of the crank hanger 10 has a bearing receiving slot 150 and a retaining ring slot 151.

A front auxiliary gear 18 has a shaft portion 180 fitted over with a bearing 181 which is restrained by a C-shaped retaining ring 182. When the retaining ring 182 is received in the retaining ring slot 151 of the front connecting mount 15, the bearing 181 is received in the bearing receiving slot 150 of the front connecting mount 15. As a result, the front auxiliary gear 18, which is fastened to the drive shaft 12, can be mounted in the front connecting mount 15 in a manner that the front auxiliary gear 18 is received appropriately in the gear cell 140 of the connecting portion 14 of the crank hanger 10. Therefore, the front auxiliary gear 18 engages with precision a front main gear 19 fastened to the crank axle 11. The maintenance work of the transmission portion of the chainless driving device of the present invention can be done easily be removing the front connecting mount 15.

Figure 9:
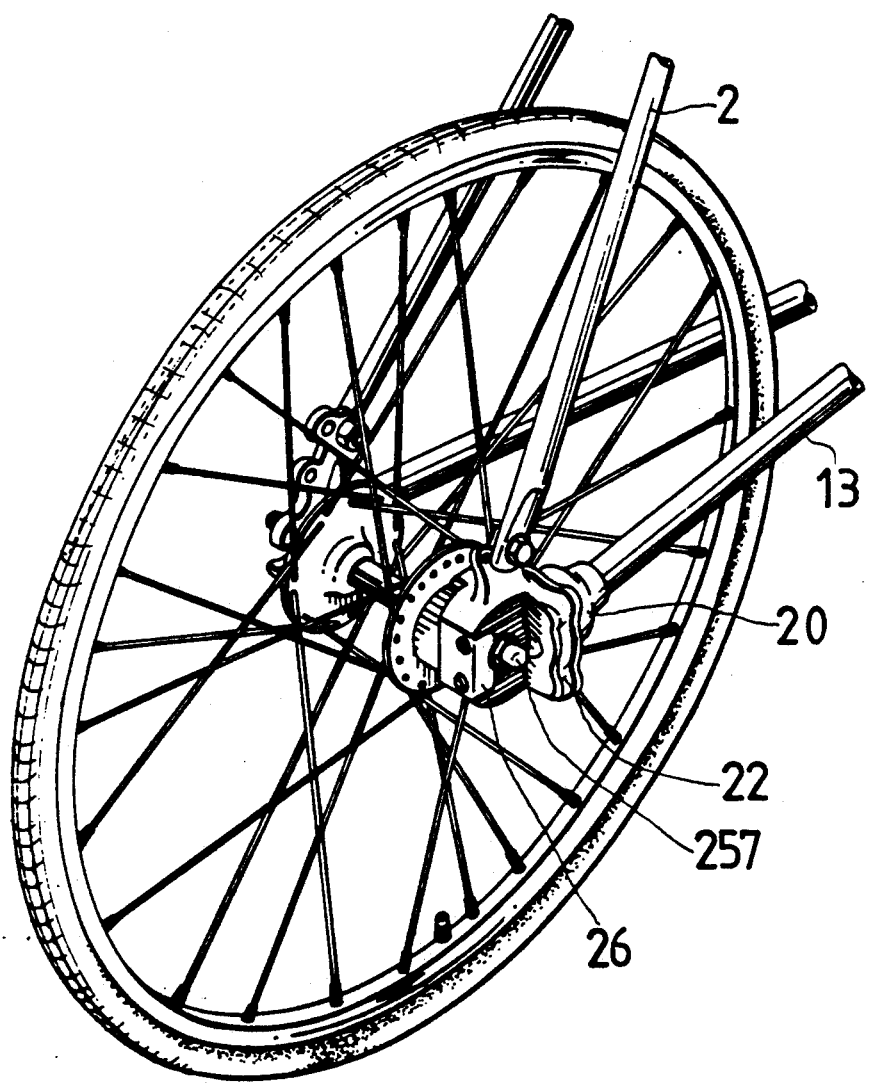
FIG. 9 shows a perspective schematic view of a gear box of the chainless driving device of the present invention.
Figure 10:
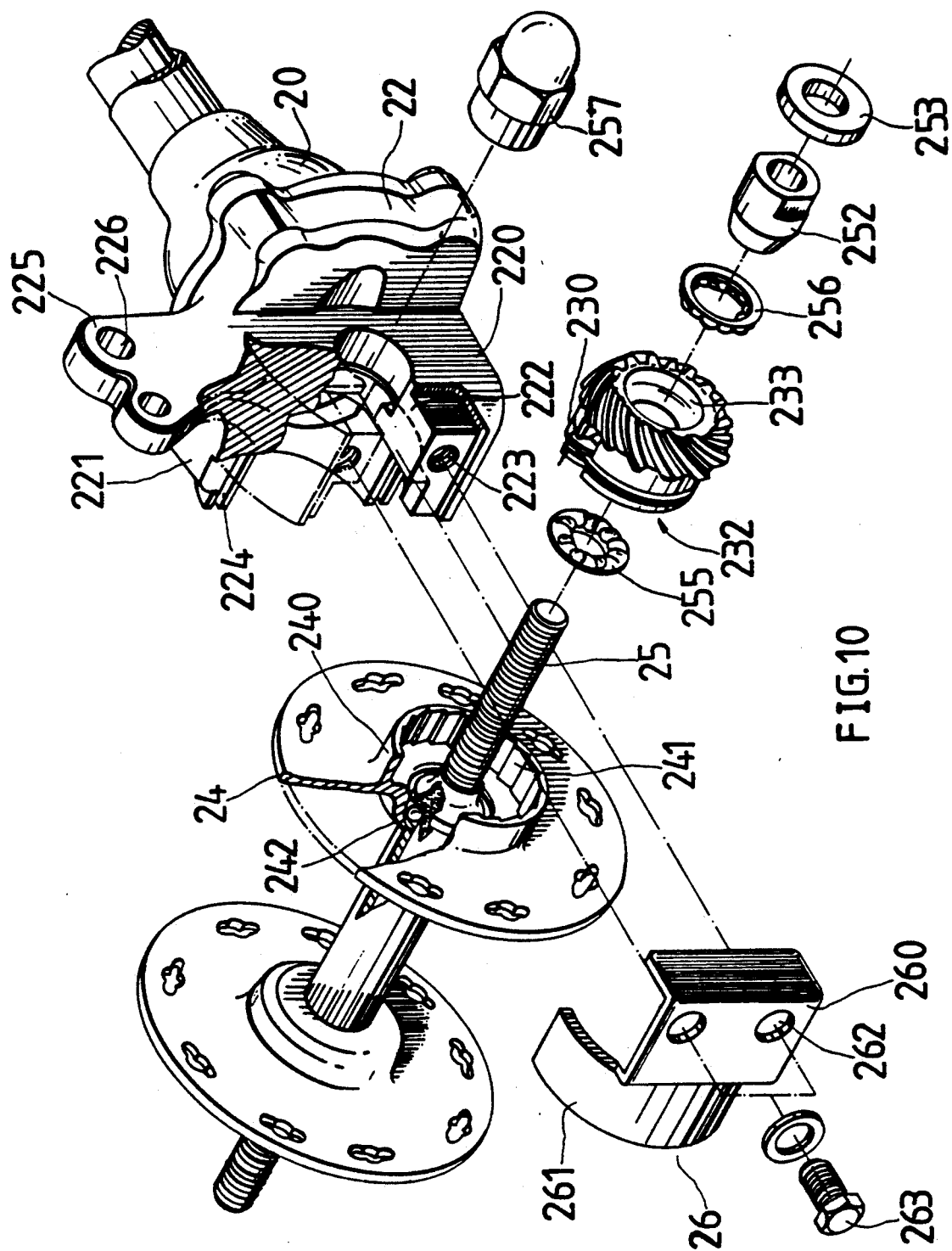
FIG. 10 shows an exploded view of the gear box of the chainless driving device of the present invention.
Figure 11:
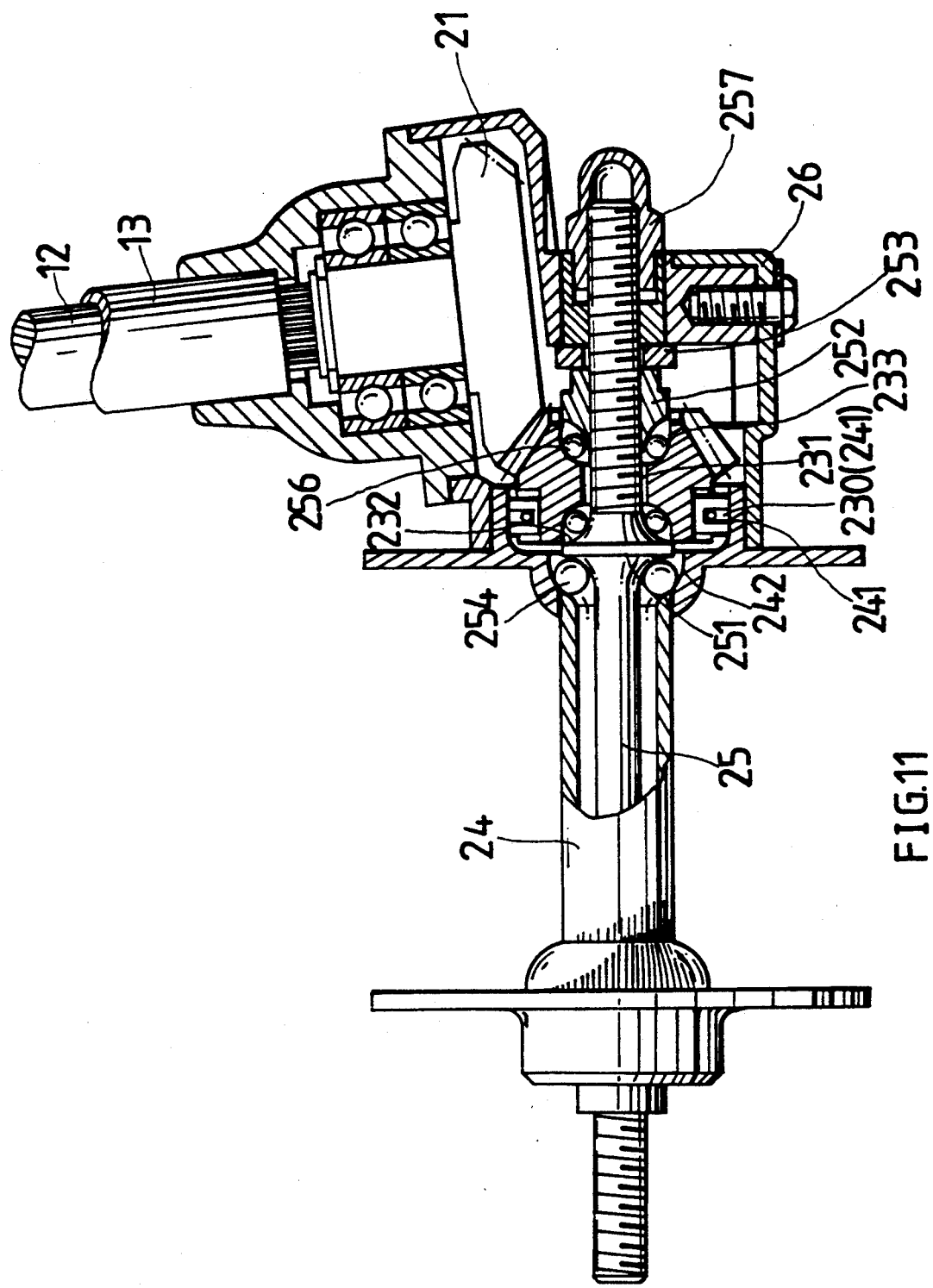
FIG. 11 shows a sectional view of a portion to which the gear box of the chainless driving device of the present invention is fastened.

There are other component parts of the chainless driving device of the present invention, which are described hereinafter in conjunction with the FIGS. 9, 10 and 11.

A rear connecting mount 20 is fitted over the fork tube 13 and is similar in shape and structure to the front connecting mount 15. A rear main gear 21 fastened to the shaft drive 12 is mounted in the rear connecting mount 15.

A gear box 22 is fastened to the rear connecting mount 20 in a manner that the rear main gear 21 engages the rear auxiliary gear 23 inside the gear box 22.

The rear auxiliary gear 23 has a shaft portion provided thereon with a one-way ratchet sleeve 230 having an axial hole 231 for receiving a rear wheel axle 25 of the nave 24. The axial hole 231 is provided with an inner ball slot 232 and an outer ball slot 233.

The rear wheel axle 25 is provided with a double-faced ball receiving portion 251 opposite in location to the inner ball slot 232 of the rear auxiliary gear 23. The rear wheel axle 25 is further provided with a ball plug 252 which is fitted over with a washer 253 and is oppsite in location to the outer ball slot 233.

The nave 24 has a drive frame 240 opposite in location to the rear auxiliary gear 23. The drive frame 240 is provided with a one-way ratchet 241 opposite in location to the one-way ratchet sleeve 230 and is further provided with a ball slot 242 opposite in location to the double-faced ball receiving portion 251. Received respectively in the ball slot 242, the inner ball slot 232 and the outer ball slot 233 are annularly-arranged balls 254,255 and 256. As a result, the rear auxiliary gear 23 can be rapidly located on the rear wheel axle 25 by forcing the ball plug 252 to move toward the inside of the outer ball slot 233, so that the one-way ratchet sleeve 230 of the rear auxiliary gear 23 meshes with the one-way ratchet 241 of the frive frame 240.

The gear box 22 has an axle locking mount 220, which is corresponding in location to the center of the rear main gear 21 and is perpendicular to the rear wheel axle 25. In addition, the gear box 22 has a semicircular frame 221 corresponding is location to the drive frame 240 of the nave 24. The axle locking mount 220 is provided with an axle receiving slot 222 for accommodating the end portion of the rear wheel axle 25, which is pushed into the axle receiving slot 222 via the side of the axle locking mount 220. The rear wheel axle 25 is fastened to the axle locking mount 220 by means of a bolt 257 in a manner that the half of the drive frame 240 of the nave 24 is surrounded by the semicircular frame 221 of the axle locking mount 220 which is further provided with a threaded hole 223. The semicircular frame 221 has an upper side and a lower side, each of which is provided with an insertion slot 224.

A rear cover 26 has a locking portion 260 and a lining frame 261. The rear cover 26 is fastened to the axle locking mount 220 by means of a bolt 263 which is put through a bolt hole 262 of the rear cover 26 to engage the threaded hole 223 of the axle locking mount 220. The rear cover 26 is fastened to the axle locking mount inserted into the insertion slot 224 of the semicircular frame 221.

The gear box 22 is further provided thereon with two lugs 225, each of which has a locking hole 226 for use in fastening the seat stay 2 to the gear box 22 by means of a bolt.

The chainless driving device of the present invention described above is characterized in that the rear auxiliary gear 23 can be easily and quickly fastened to the rear wheel axle 25, and that the real wheel axle 25 can be rapidly fastened to the axle receiving slot 222 of the gear box 22 by means of the bolt 257, and further that the seat tube 1 and the seat stays 2 can be fastened easily to the chainless driving device of the present invention.

In addition, the rear auxiliary gear 23 of the rear wheel axle 25 is supported on the ball 254 while the nave 24 is supported on the ball 256. As a result, the external reaction force coming from the rear wheel does not interfere with the engagement of the rear main gear and the rear auxiliary gear. Therefore, the transmission stability of the chainless driving device of the present invention is attained.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the hereinafter appended claims.

I claim:

1. A chainless driving device of a bicycle, comprising:
   a crank hanger housing a crank axle and having a connecting portion provided therein with a gear cell in communication with said crank hanger, with said connecting portion fastened with a front connecting mount in which a front auxiliary gear fastened to a drive shaft is mounted in a manner that said front auxiliary gear meshes with a front main gear fastened to said crank axle such that the crank axle is in communication with a rear wheel axle via said drive shaft;
   a rear connecting mount fitted over a rear end of a fork tube and provided with a rear main gear mounted therein in a manner that said rear main gear meshes with a rear auxiliary gear in a gear box fastened to said rear connecting mount, said rear auxiliary gear having a shaft portion provided with a one-way ratchet sleeve and with an axial hole receiving therein said rear wheel axle, said rear wheel axle including a nave, said nave including a drive frame on its rear surface to receive said rear auxiliary gear, said drive frame having a one-way ratchet fastened to said shaft portion of said rear auxiliary gear in a manner that said one-way ratchet engages said one-way ratchet sleeve; and
   an axle locking mount arranged in said gear box in a manner that said axle locking mount is mounted in a position perpendicular to said rear wheel axle, said axle locking mount having an axle receiving slot for receiving and locking therein an end portion of said rear wheel axle, a nut being secured to the end portion of the rear axle after the axle passes through the axle receiving slot.

2. The chainless driving device of a bicycle of claim 1 wherein said crank hanger includes a tube locking mount having a plurality of through holes, said tube locking mount being connected to a connecting frame of a seat tube having a plurality of round holes corresponding in location and number to said through holes of said locking mount, so that said seat tube is fastened to said crank hanger by means of a plurality of bolts passing through said through holes and said round holes.

3. The chainless driving device of a bicycle of claim 1 wherein said front connecting mount and said rear connecting mount are fastened by means of bolts to a connecting portion of said crank hanger and said gear box, with said front connecting mount and said rear connecting mount each including an axle receiving slot for locating said front auxiliary gear and said rear gear, said front auxiliary gear and said rear main gear each including a shaft portion enclosed by a bearing, the bearing being held in place by a C-shaped retaining ring.

4. The chainless driving device of a bicycle of claim 1 wherein said rear auxiliary gear has an axial hole to receive therein said rear wheel axle, with said axial hole provided with an inner ball slot and an outer ball slot, said inner slot being opposite in location to a double-faced ball receiving portion of said rear wheel axle, said outer ball slot being opposite in location to a ball plug of said rear wheel axle, said outer ball slot being opposite in location to a ball plug of said rear wheel axle, with said double-faced ball receiving portion, said inner ball slot and said outer ball slot containing therein respectively an annularly-arranged ball chain.

5. The chainless driving device of a bicycle of claim 1 wherein said wheel axle is contained in said axle receiving slot of said axle locking mount in a manner that said rear wheel axle is separated from said rear auxiliary gear by a distance provided by ball bearings, and that said rear auxiliary gear is supported on a ball chain different from a ball chain supporting said nave.

6. The chainless driving device of a bicycle of claim 1 wherein said gear box has a semicircular frame provided with two insertion slots opposite in location to a frame body of said rear cover.

7. The chainless driving device of a bicycle of claim 1 wherein said gear box is provided with a lug having a locking hole which mates with a fastening hole situated at a lower end of a seat stay of said bicycle.

* * * * *